Feb. 15, 1927.
R. W. DOUGLAS
1,617,747
EGG BEATER HOLDER
Filed April 19, 1926
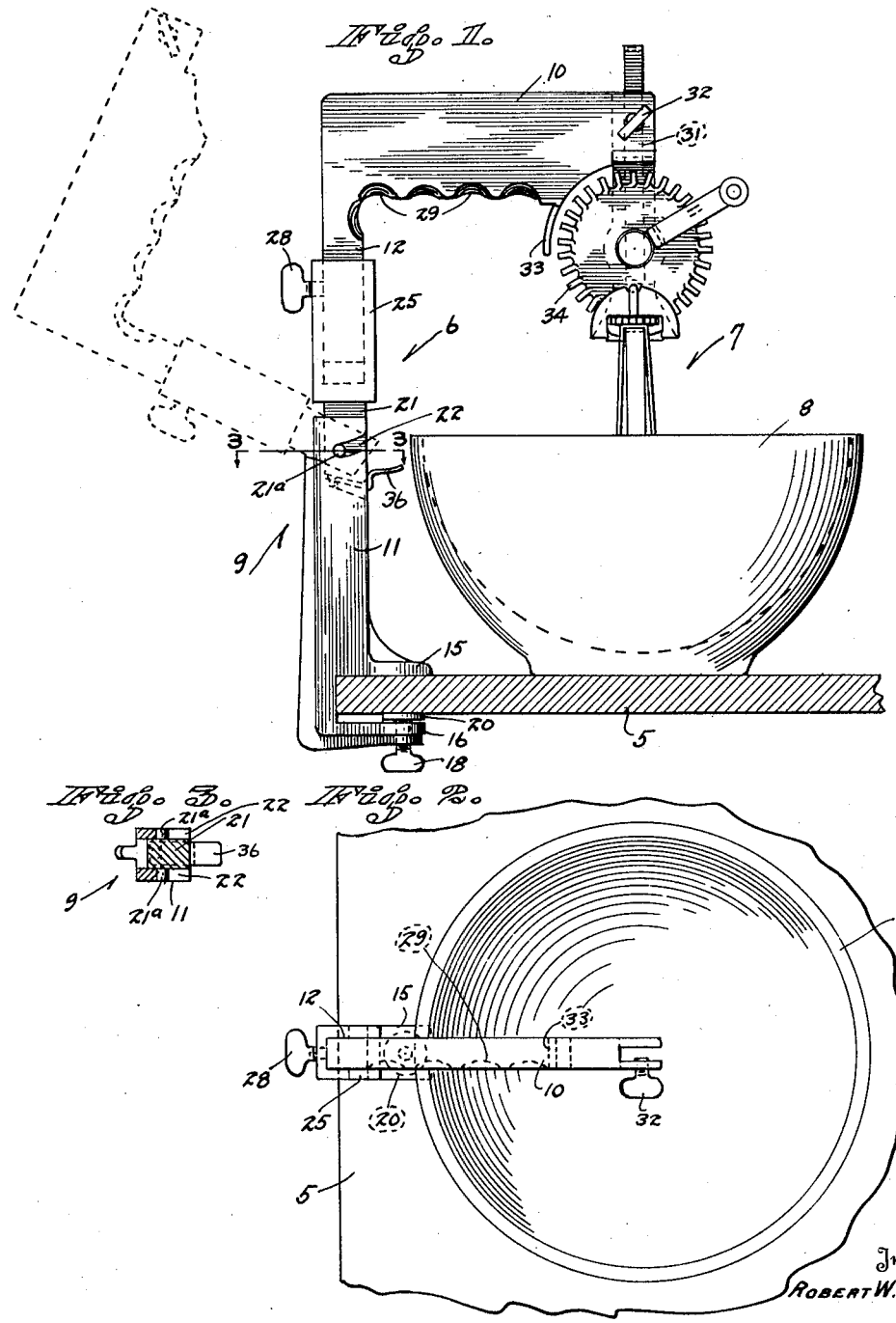
Inventor
Robert W. Douglas
By
Attorneys.

Patented Feb. 15, 1927.

1,617,747

UNITED STATES PATENT OFFICE.

ROBERT W. DOUGLAS, OF CHICO, CALIFORNIA.

EGG-BEATER HOLDER.

Application filed April 19, 1926. Serial No. 102,990.

This invention relates to egg beater holders and it has for one of its objects the provision of a simple, efficient and economical egg beater holder.

With the foregoing object in view, together with such other objects and advantages as may subsequently appear, this invention resides in the construction and arrangement of parts hereinafter described and claimed, and illustrated in the accompanying drawings, in which—

Figure 1 is a side elevation of my improved egg beater holder showing an egg beater attached thereto, the lower end of the beater being in a bowl. This view also shows in dotted lines the upper part of the egg beater holder thrown back in order to lift the egg beater out of the bowl;

Figure 2 is a plan view of Figure 1; and

Figure 3 is a horizontal section taken on line 3—3 of Figure 1.

Referring to the drawings for a more detailed description thereof, the numeral 5 indicates the top of a table, to the edge of which the egg beater holder 6 is secured at its lower end. The egg beater holder holds an egg beater 7, the lower end of which is in a bowl 8 containing material to be beaten.

The egg beater holder comprises a standard 9 and an arm 10 extending laterally from the standard. The standard 9 comprises a lower section 11 to which is pivoted an upper section 12. This pivotal connection enables the upper section, together with the arm 10, to be thrown back into the postion shown in dotted lines in Figure 1 when the egg beater is withdrawn from the bowl 8. It will be understood that the egg beater remains secured to the arm 10 when the latter is thrown back into the position shown in dotted lines.

The lower section 11 of the standard 9 is bifurcated to provide spaced jaws 15 and 16 for the reception therebetween of the edge portion of the table 5. A screw 18 passes through the jaw 16 and is provided with a disk 20 bearing against the under side of the table 5. It will be readily understood that by tightening the screw 18 the egg beater holder may be secured to the table.

The upper end of the lower section 11 of the standard is bifurcated to receive the lower end portion 21 of the upper section 12, the portion 21 being of reduced thickness. The section 21 is provided with trunnions 21ª which rest in slots 22 provided in the upper portion of the section 11. These slots 22 extend to the sides of the section 11 so that the upper section 12 may be readily disconnected from the lower section 11 of the standard.

The upper section 12 comprises a tubular portion 25, the lower end of which is secured to the portion 21: The upper part of the tube 25 receives the upper portion of the section 12, which is independent of the portion 21. A screw 28 extends through a side of the tube 25 in order to secure the upper portion 12 of the standard in the tube.

The lower portion of the arm 10 on both sides thereof is provided with depressions 29 which fit the fingers. The free end of the arm 10 is bifurcated to receive the handle 31 of the egg beater 7. The handle of the egg beater may be firmly secured to the arm 10 by means of a tightening screw 32. At the lower end of the arm 10 an arcuate guard 33 is provided, so that the wheel 34 of the beater may not injure a hand which grasps the arm 10.

In order to lock the upper section 12 to the lower section 11 when both of these sections are in alinement, locking means in the form of a spring 36 is provided, this spring being secured in a recess of the lower section 11 adjacent the lower end of the section 21 and normally pressing against the inner side face of the upper section.

While I have described one embodiment of my invention, modifications thereof may be readily devised without departing from the spirit of my invention, and it is to be understood that such modifications come within the scope of the appended claim.

I claim:

In an egg beater holder, a standard, an arm extending laterally from said standard and adapted to hold an egg beater, said standard comprising two pivoted sections adapted to allow the upper section to be turned at an angle to the lower section, and means for locking the upper section to the lower section when the two sections are in alinement, said locking means comprising a resilient spring secured in a recess of the lower section and normally pressing against the inner side of the upper section of the standard.

ROBERT W. DOUGLAS.